Patented May 27, 1930

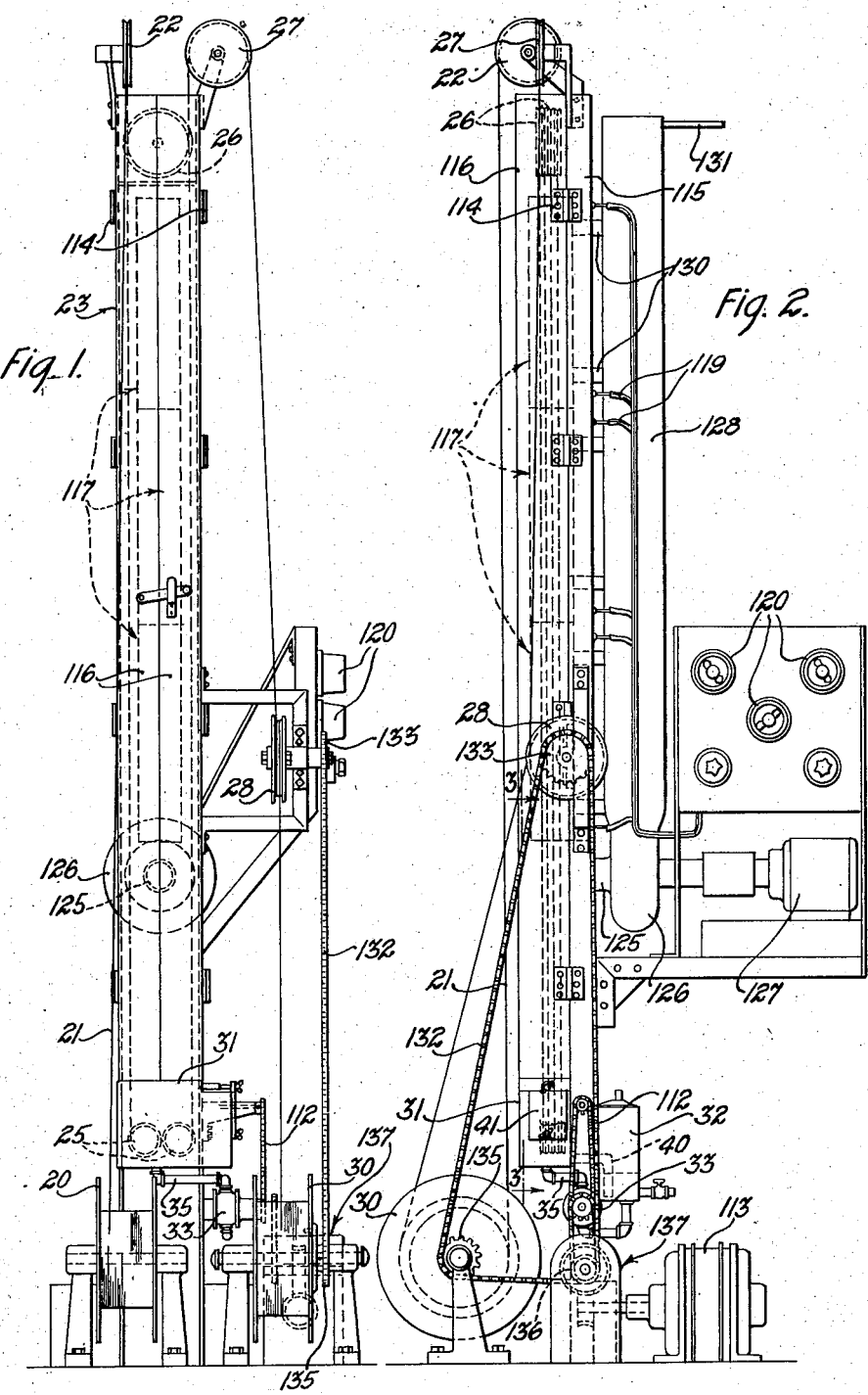

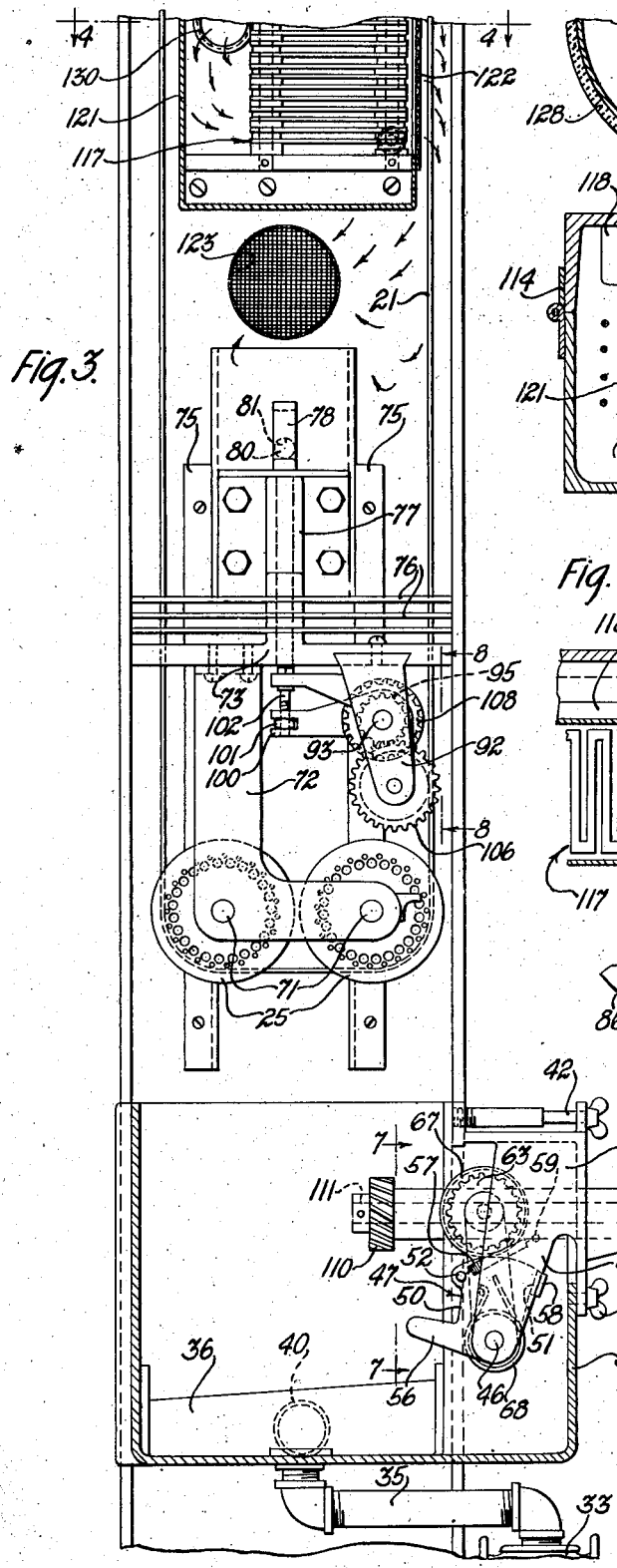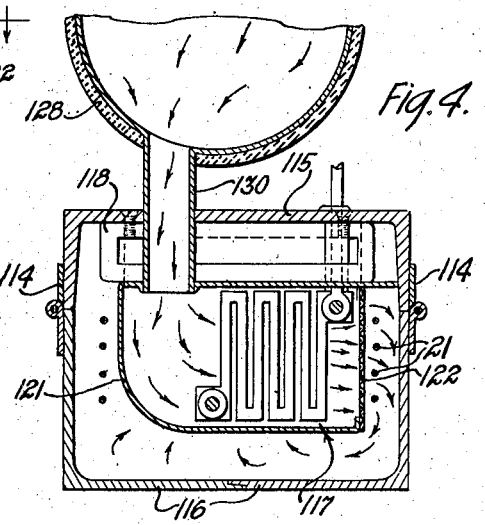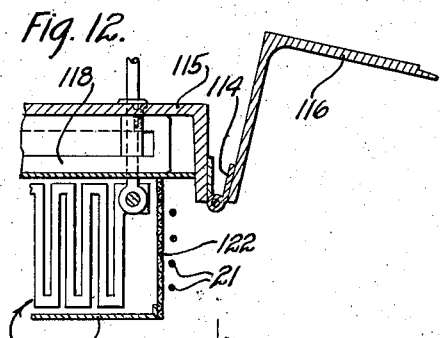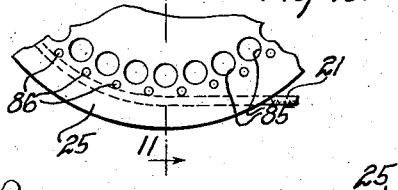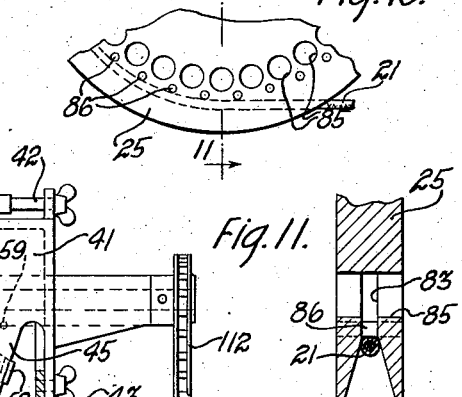

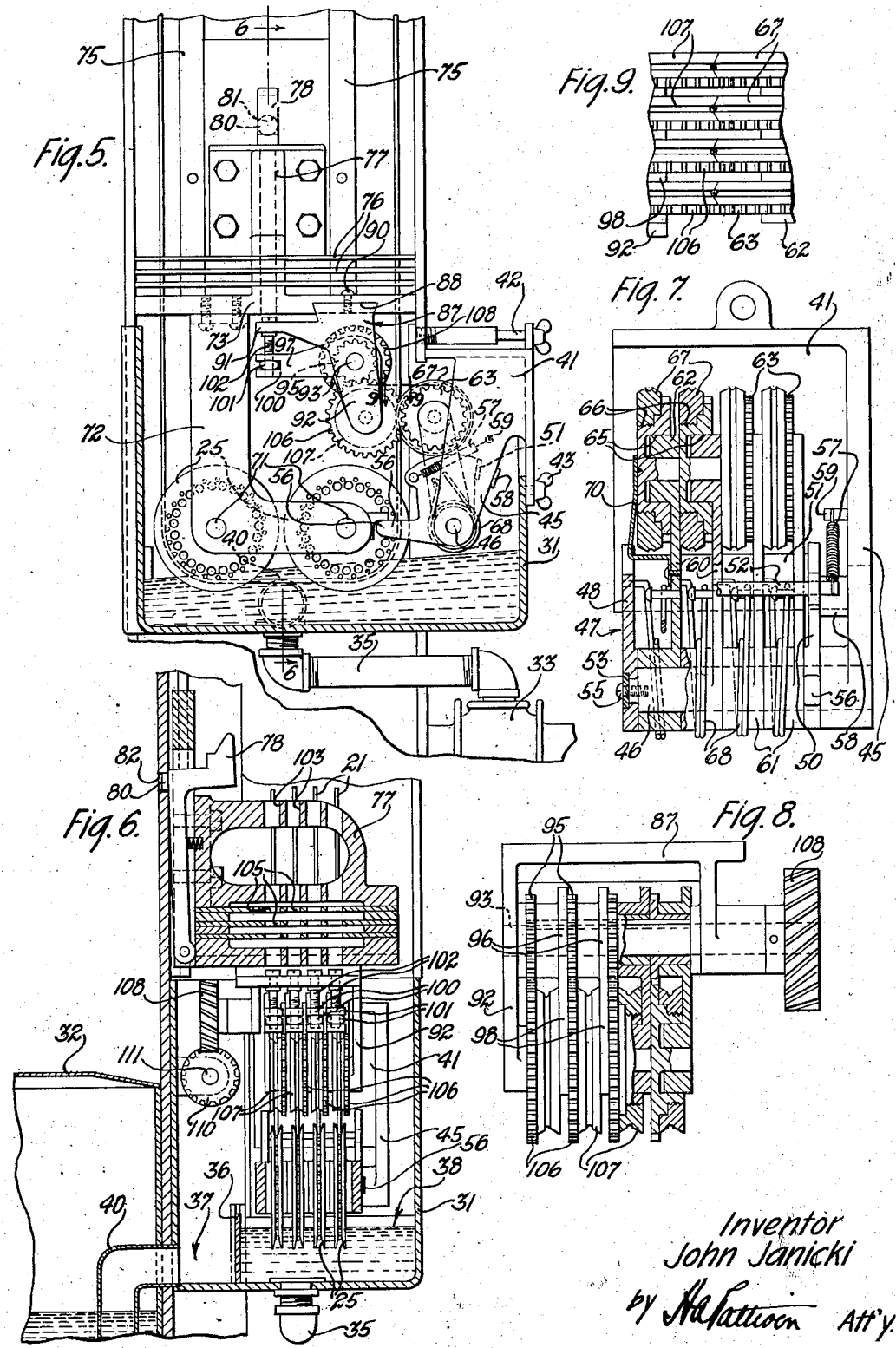

1,759,850

UNITED STATES PATENT OFFICE

JOHN JANICKI, OF OAK PARK, ILLINOIS, ASSIGNOR TO WESTERN ELECTRIC COMPANY INCORPORATED, OF NEW YORK, N. Y., A CORPORATION OF NEW YORK

STRAND-COATING APPARATUS

Application filed September 16, 1927. Serial No. 219,947.

This invention relates generally to strand coating apparatus, and more particularly to apparatus for treating insulated electrical conductors with a material to improve the insulating properties and to render it waterproof and non-inflammable.

The object of the invention is to provide an apparatus for effectively and rapidly coating a strand with a uniform adherent coating of suitable coating material.

In accordance with the general features of the invention, there is provided a container for holding a coating material adjacent which is a heating chamber provided with heating units and an air circulating system. A strand, such as an electrical conductor, is drawn by means of a capstan successively through the material in the container over specially constructed sheaves, which insure complete coating of the strand, through a set of strand engaging rolls for removing excess coating material and through the heating or drying oven. The coating material is dried upon the strand in the heating chamber after which it is drawn over the capstan onto a take-up reel which is driven synchronously with the capstan to prevent vibration of the strand.

The invention will be clearly understood from the following detailed description of a specific embodiment thereof taken in connection with the accompanying drawings, in which—

Fig. 1 is a front elevational view of a strand coating apparatus embodying the invention;

Fig. 2 is a side elevational view thereof;

Fig. 3 is an enlarged fragmentary sectional view thereof taken on the line 3—3 of Fig. 2;

Fig. 4 is an enlarged fragmentary transverse sectional view thereof taken on the line 4—4 of Fig. 3;

Fig. 5 is a fragmentary sectional view thereof similar to Fig. 3 showing the parts in another position;

Fig. 6 is an enlarged sectional view taken on line 6—6 of Fig. 5;

Fig. 7 is an enlarged elevational view partly in section of a set of rolls forming a part of the apparatus, which rolls are shown as viewed substantially from the position assumed by line 7—7 of Fig. 3;

Fig. 8 is an elevational view partly section of another set of rolls forming a part of the apparatus, which rolls are shown as viewed substantially from the position assumed by line 8—8 of Fig. 3;

Fig. 9 is an enlarged fragmentary sectional view of the apparatus taken on line 9—9 of Fig. 5;

Fig. 10 is an enlarged fragmentary elevational view of a sheave forming a part of the apparatus;

Fig. 11 is a sectional view of the sheave taken on line 11—11 of Fig. 10, and

Fig. 12 is a diagrammatic view similar to Fig. 4 showing some of the members in their extended position.

In the drawings, in which like numerals designate like parts throughout the several views, the numeral 20 (Fig. 1) designates a supply reel upon which there may be wound a strand 21 to be coated. From the reel 20 the strand passes over a sheave 22 suitably secured upon a heating chamber designated generally by the numeral 23 into which the strand 21 passes and extends downwardly to a point near the bottom of the heating chamber where it passes over a plurality of sheaves 25—25, (Fig. 3) after which it extends upwardly and over one of a plurality of sheaves 26—26 rotatably mounted in the upper portion of the heating chamber 23. The strand then passes downwardly and upwardly through the chamber over sheaves similar to sheaves 25—25 and 26—26 hereinbefore mentioned any desired number of times, depending upon the number of coatings which it is desired to place upon the strand, after which it emerges from the upper end of the heating chamber 23 and passes over a sheave 27, onto and around a capstan 28 and then onto a take-up reel 30.

Positioned directly below the heating chamber 23 and in communication therewith is a container 31 for holding a coating material, such as a solution formed by dissolving a base material in a volatile solvent, which is forced into the container 31 from a supply tank 32 by means of a pump 33 through an inlet pipe 35 leading into the bottom of the container 31. The container 31 is divided into two compartments 37 and 38 as shown in Fig. 6 by means of a weir or dam 36 which maintains a constant level in the coating material pumped through the pipe 35 into the compartment 38, the excess coating material flowing over the weir 36 into the compartment 37 and into the supply tank 32 through an overflow pipe 40 which is submerged in the coating material contained therein.

A frame 41 is secured within the compartment 38 of the container 31 by means of bolts 42 and 43, which frame includes a downwardly extending arm 45 upon which a laterally extending shaft 46 (Fig. 7) is rigidly mounted. Another frame 47 comprising arms 48 and 50 and cross bars 51 and 52 is pivotally mounted upon the shaft 46 and is secured thereon by means of a plate 53 secured upon the shaft 46 by a bolt 55. The arm 50 has a laterally extending finger 56 (Figs. 3 and 5) formed thereon and a spring 57 which is secured upon the end of the cross bar 52 adjacent the arm 45 and to a post 59 extending from the arm 45 normally urges the frame 47 against a stop member 58 extending from the arm 45 as seen in Fig. 3.

A plurality of arms 60—60 having hub portions 61—61 and 62—62 formed upon opposite ends thereof are also pivotally mounted by means of the hub portions 61—61 upon the shaft 46 and extend upwardly therefrom between the cross bars 51 and 52 on the frame 47. Gears 63—63 having sockets 65—65 formed therein are rotatably mounted upon the arms 60—60 by positioning the gears so that the hub portions 62—62 upon the ends of the arms 60—60 extend into the sockets 65—65 formed in the gear as shown in cross-section in Fig. 7. The gears 63—63 are also provided with threaded hub portions 66—66 upon which are threaded strand-engaging rolls 67—67 which rotate with the gears 63—63 as if integral therewith, the arms 60—60 serving to maintain the gears and associated rolls most closely adjacent the arm 45 in position while the outer gear and its associated roll are maintained in operative position by means of a bent spring 70 which is secured at its lower end to the outermost arm 60 and is in contact at its upper end with the outermost gear 63 to urge the latter toward the outermost arm 60. The arms 60—60, the gears 63 and the rolls 67—67 are individually urged to the left as viewed in Figs. 3 and 5 by means of coiled springs 68—68 which are secured at one end to the cross bar 52, and after encircling the hub portions 61—61 on the arms 60—60 are secured at the other ends to the arms 60—60 as shown in Fig. 7, so that the arms 60—60 normally engage the cross bar 52 in the positions shown in Fig. 3.

The sheaves 25—25 mentioned hereinbefore are rotatably mounted upon shafts 71—71 rigidly secured upon an L-shaped arm 72 depending from a frame 73 which is slidably mounted in guides 75—75 secured upon the back of the heating chamber 23. The frame 73 has a plurality of baffle plates 76—76 mounted thereon and is provided with a handle 77 by means of which it may be raised and lowered, and a spring pressed latch 78 (Figs. 3 and 6) having a lug 80 formed thereon which coacts with apertures 81 and 82 in the heating chamber 23 is provided for latching the frame 73 in either its elevated position as shown in Fig. 3 or in its depressed position as shown in Fig. 6. Each of the sheaves 25—25 is provided with a peripheral Y-shaped groove 83 (Figs. 10 and 11) which is intersected at points adjacent the bottom thereof by a circular series of apertures 85—85, and a circular series of strand supporting pins 86—86 are positioned in the sheave so as to extend transversely across the groove 83 to form a substantially continuous, circular false bottom for the groove 83 against which the strand 21 to be coated comes in contact.

An auxiliary frame 87 (Fig. 5) is removably secured within a groove 88 in the frame 73 by means of a screw 90 and the frame 87 is provided with a laterally extending arm 91 and a downwardly extending arm 92 from which a shaft 93 rotatably mounted therein extends in a lateral direction. A plurality of gears 95—95 are rigidly secured upon the shaft 93 and are spaced from each other by L-shaped members 96—96 having outwardly extending arms 97—97 and downwardly extending arms 98—98, which members are loosely mounted at their intermediate portions upon the shaft 93. The arms 97—97 of the L-shaped members 96—96 are provided with fork shaped ends 100—100 in each of which is fixedly mounted a nut 101 which coacts with a bolt 102 rotatably mounted in the lateral extending portion 91 of the frame 87. The bolts 102—102 may be rotated by means of a socket wrench of any suitable type which may be inserted through apertures 103—103 and 105—105 formed in the handle 77 and in the baffle plates 76—76. A plurality of gears 106—106 which are slightly larger than the gears 63—63 mesh with gears 95—95 and are rotatably secured upon the ends of the arms 98—98 as seen in Fig. 8 in a manner similar to that described for the gears 63—63, and a plurality of strand engaging rolls 107—107 are threaded upon the gears 106—106 in a manner similar to that described for the rolls 67—67. A spiral gear 108 (Fig. 8) is rigidly secured upon the end of the shaft 93 and cooperates when the frame 73 is lowered with a spiral gear 110 (Fig. 6) rigidly mounted upon a shaft 111 extending into the container 31 hereinbefore-described which shaft is driven by means of a chain 112 connected through a suitable driving mechanism to an electric motor 113.

The heating chamber 23 comprises an elongated channel member 115 (Fig. 4) which forms the back of the chamber, and a pair of L-shaped doors 116—116 are pivotally mounted upon the channel 115 by means of hinges 114—114. A plurality of heating units 117—117 are positioned within the chamber 23 and spaced from the back thereof by means of a spacing member 118, which heating units 117—117 are connected to a source of electrical current through conductors 119—119 and are controlled individually by means of switches 120—120. The heating units 117—117 are partially surrounded by a partition 121 (Fig. 4) and a wire screen 122. A screen covered aperture 123 is provided in the channel 115 at a point below the lowermost heating unit 117 and a conduit 125 leads from the aperture 123 to the inlet port of a blower fan 126 driven by means of an electric motor 127. An elongated conduit 128 connected to the outlet port of the fan 126 extends upwardly, parallel to the channel 115, and is provided with a series of pipes 130—130 (Figs. 3 and 4) which extend into the heating chamber 23 and through the spacing member 118 to positions adjacent the heating units 117—117. The upper end of the conduit 128 is closed and a small bleed pipe 131 leading to the open air or to a solvent recovery system (not shown) for conducting away solvent vapors, is connected to the conduit 128 near the upper end thereof.

The capstan 28 and the take-up reel 30 hereinbefore described are driven in synchronism by means of a chain 132 which connects the capstan and the take-up reel through sprockets 133 and 135, respectively, to a sprocket 136 connected to the electric motor 113 through a gear reducing mechanism designated generally by the numeral 137.

The operation of the mechanism is as follows: A supply of a suitable coating material is placed in the supply tank 32, and a supply reel 20 upon which a strand 21, such as a cotton covered electrical conductor, to be coated is wound, is placed in association with the apparatus as seen in Fig. 1. The doors 116—116 are opened, the frame 73 is raised into its elevated position as shown in Fig. 3 and the end of the strand 21 is threaded over the sheave 22, around one set of the sheaves 25—25 and around one of the sheaves 26—26, then down and over another set of the sheaves 25—25 and over one of the sheaves 26—26 the desired number of times, after which it is passed over the sheave 27, around the capstan 28 and is secured to the take-up reel 30. The latch 78 is released and the frame 73 is lowered from the position shown in Fig. 3 to the position shown in Figs. 5 and 6.

During the lowering of the frame 73 the end of the arm 72 depending therefrom comes into contact with the finger 56 extending laterally from the frame 47 as shown in Fig. 5 and rotates the frame 47 about the shaft 46 against the force of the spring 57. Due to the action of the coiled springs 68—68 the rotation of the frame 47 causes the arms 60—60, the gears 63—63 and the strand engaging rollers 67—67 carried thereby to be rotated to the left as seen in Fig. 5 so that the gears 63—63 mesh with the gears 106—106 carried by the arms 98—98 and the strand engaging rolls 67—67 to cooperate with the strand engaging rolls 107—107 to encircle the strand 21 passing therebetween as shown in Fig. 9 and to thereby present a substantially circular strand engaging surface surrounding the strand. At the same time that the above mentioned gears and strand engaging rolls come into operative relationship the spiral gear 108 secured upon the end of the shaft 93 meshes as shown in Fig. 6 with the spiral gear 110 carried by the shaft 111 in the container 31.

After the frame 73 has been lowered, the doors 116—116 are closed and latched in position, the heating units 117—117 are energized and the motor 127 driving the fan 126 is then started to cause a circulation of air from the fan through the conduit 128 into the space surrounding the heating units 117—117 through the pipes 130—130, through the screen 122 into contact with the strands 21—21 adjacent the screen, in a downward direction parallel to the strand, out of the chamber through the aperture 123 and into the inlet port of the fan 126 through the conduit 125 as is indicated by the arrows in Figs. 3 and 4. After the temperature of the heating chamber 23 has been raised to the desired point by the heating units and the air circulating system, the motor 113 is started whereupon the pump 33 forces the coating material from the supply tank 32 through the pipe 35 into the compartment 38 in the container 31, the excess coating material flowing over the weir 36 into the compartment 37 and back into the supply tank 32 through the pipe 40 which is submerged in the coating material in the supply tank 32 in order to prevent circulation of air through the overflow pipe.

At the same time the pump is placed in operation, rotation of the capstan 28 and of the take-up reel 30 is also started and the strand 21 is drawn from the supply reel 20 through the heating chamber into and through the coating material in the container 31 up between the strand engaging rolls 67—67 and 107—107 and through the heating chamber 23 onto the sheave 26. During its passage through the coating material the strand is completely coated thereby and the sheaves 25—25 are so constructed that the coating material along the strand passing thereover is not removed by the sheaves from the inner side of the strand, the strand resting in its passage over the sheaves upon the pins 86—86 and the coating material passing through the apertures 85—85 in the sheaves into the grooves 83—83 formed in the periphery of the sheaves and passing between the pins 86—86 and onto the strand.

Immediately after leaving the sheaves 25—25 the coated strand passes between the strand engaging rolls 67—67 and 107—107 which are rotated in the direction of travel of the strand by means of the gears 95—95, 106—106 and 63—63. Since the rolls 67—67 are individually urged toward the rolls 107—107 by the action of the springs 57 and 68—68 and since the rotation of the rolls is in the direction of travel of the strand, the rolls effect a wringing action upon the strand which tends to control the quantity of coating material left upon the strand. The gears which rotate the strand engaging rolls are so related that the velocity of each of the rolls is less than that of the strand passing therebetween and due to the fact that the gears 106—106 are larger than the gears 63—63, each roll is rotated at a velocity different from that of its companion roll. The result of these relative movements between the individual rolls and between the rolls and the strand is that the rolls effect a simultaneous wringing and wiping action upon the strand passing therebetween and at the same time effect a wiping action upon each other, as a result of which only the desired amount of the coating material is left upon the strand and that which remains is thoroughly compacted thereon, while the wiping action between the individual rolls tends to prevent the accumulation of the coating material upon the surfaces of the rolls.

The strand engaging rolls may be adjusted to accommodate strands of various diameters by means of the bolts 102—102 which may be rotated by means of socket wrenches inserted through the openings 103—103 and 105—105 to swing the rolls 107—107 to the left or right, as seen in Figs. 3 and 5, depending upon the increased or decreased diameter of the strand to be accommodated, the springs 68—68 serving to cause the rolls 67—67 to coact with the rolls 107—107 regardless of the position of the latter rolls.

The coated strand after having the excess coating material removed by the above mentioned rolls is drawn upwardly through the heating chamber 23 where it comes into contact with the downwardly traveling current of heated air emerging from around the heating units 117—117 through the screen 122, and the solvent is evaporated from the surface of the strand and the coating material is dried thereon during the upward passage of the strand through the heating chamber. After traversing the full length of the heating chamber the strand passes over one of the sheaves 26—26 and is carried through the above described operations an additional number of times to form added coatings upon the strand, the number of coatings depending upon the characteristics desired in the completed article.

After having the desired number of coatings formed thereon, the strand is drawn over the sheave 27 and around the capstan 28 and is wound upon the take-up reel 30. Since the sprocket 135 which drives the take-up reel 30 and the sprocket 133 which drives the capstan 28 are each driven by the chain 132 and the chain is actuated in a counter-clockwise direction, as seen in Fig. 2, both of the sprockets are on the tight side of the chain and in consequence the capstan and the take-up reel are driven in synchronism so that no vibration is transmitted to the coated strand passing from the capstan to the take-up reel. This is advantageous because if vibration in the strand passing through the apparatus is practically eliminated, the strand may be carried past the screen 122 in close proximity thereto without striking the latter and the desired heating of the strand may be effected by a low power input to the heating units 117—117 or by the use of a small volume of air, whereas if the strand were vibrating with a large amplitude while traversing the heating chamber 23 it would be necessary to position the strand at a greater distance from the screen 122 and to increase the power input to the heating units 117—117 or else to increase the volume of air circulated.

A saving in the power input of the heating units 117—117 is also effected by the re-circulation of the heated air exhausted from the heating chamber through the aperture 123 through the conduit 128 and the pipes 1? -130, while the provision of the bleed-pipe 131—131 permits the escape of a sufficient amount of the solvent vaporized in the heating chamber 23 to keep the vapor content of the air circulated through the chamber below the concentration which might form an explosive mixture with air if the solvent is inflammable. Since the bleed pipe 131 is on the pressure side of the fan 126, a portion of the air and vapor mixture is forced out of the system through the pipe 131 thereby tending to cause a partial vacuum within the heating chamber 23 which is compensated for by leakage of air into the chamber from the outside thereof through various cracks and openings therein. The result is that the mixture circulated through the system is being constantly diluted by the incoming air to keep the fluid at a non-explosive composition and at the same time the vapors produced within the heating chamber are prevented from escaping into the room within which the apparatus is placed because of the fact that there is a tendency for a partial vacuum to be formed within the chamber 23 and in consequence the passage of air is always from the outside of the chamber towards the inside thereof.

The doors 116—116 may be readily and quickly swung from their closed position, as shown in Fig. 4, to their open position as shown diagrammatically in Fig. 12, in which open position the strand passing through the heating chamber 23 is completely exposed throughout the entire length of the chamber, so that in case the strand passing through the heating chamber is for any reason heated to too high a temperature the doors may be swung in their open position to expose the strand to the outside air, whereupon the strand will be immediately cooled to a lower temperature.

What is claimed is:

1. A strand coating apparatus comprising means for applying a coating material upon a strand, companion strand-engaging rolls, means for advancing a coated strand between the rolls, and means for rotating each of the rolls at a velocity different from that of the coated strand to effect a wiping action thereon.

2. A strand coating apparatus comprising means for applying a coating material upon a strand, companion strand-engaging rolls, means for advancing a coated strand between the rolls, and means for rotating the rolls in the direction of travel of the strand at a velocity different from that of the strand to effect a wiping action upon the coated strand.

3. A strand coating apparatus comprising means for applying a coating material upon a strand, companion strand-engaging rolls, means for urging the rolls into material contact, means for advancing a coated strand between the rolls, and means for rotating the rolls at different relative velocities in the direction of travel of the strand to effect a wiping action upon the coated strand.

4. A strand coating apparatus comprising means for applying a coating material upon a strand, companion strand-engaging rolls, means for urging the rolls into material contact, means for advancing a coated strand between the rolls, and means for rotating each of the rolls in the direction of travel of the strand at a velocity different from that of its companion roll and from that of the strand to simultaneously compress the coating material upon the strand and wipe excess coating material off of the strand.

5. A strand coating apparatus comprising means for applying a coating material upon a strand, companion strand-engaging rolls, means for advancing a coated strand from the coating means through the rolls, and means for rotating each of the rolls in the direction of travel of the strand at a velocity different from that of its companion roll and less than that of the strand.

6. A strand coating apparatus comprising a container for holding a coating material, a frame slidably mounted for insertion within the container, a plurality of sheaves rotatably mounted upon the frame, a plurality of rolls removably secured upon the frame, a plurality of rolls positioned within the container so as to engage the first mentioned rolls when the frame is slid into the container, means for positively rotating all of the rolls when in mutual engagement, and means for advancing a strand over the sheaves to immerse the strand in the coating material and between the rolls to remove excess coating material from the coated strand.

7. A strand coating apparatus comprising a container for coating material, a frame slidably mounted and movable into the container, a sheave mounted upon the frame, a roll mounted upon the frame, a roll mounted adjacent the container so as to engage the first mentioned roll when the frame is moved into the container, driving means for the rolls operative when the frame is moved into the container, and means for advancing a strand over the sheave to immerse the strand in the coating material and between the rolls to remove excess coating material from the coated strand.

8. A strand coating apparatus comprising a container for coating material, a wiper roll yieldingly mounted adjacent the container, a second wiper roll adapted to cooperate with the first mentioned roll and movable to an inoperative position, and means operative when the second roll is moved to its operative position to move the first mentioned roll into engagement with the second roll.

9. A strand coating apparatus comprising a pair of cooperating wiper rolls each movable to operative and inoperative positions, and means operative upon movement of one of the rolls to its operative position to move the other roll to its operative position.

10. A strand coating apparatus comprising a pair of cooperating wiper rolls each movable to an operative position adjacent the other and to an inoperative position remote from the other to permit threading a strand therebetween, and means operative upon movement of one of the rolls to its operative position to move the other roll to its operative position.

11. A strand coating apparatus comprising a container for a supply of coating material, a sheave normally positioned to project into the coating material and movable out of contact with the coating material, a wiping roll movable with the sheave, and a second wiping roll normally cooperating with the first mentioned roll.

12. A strand coating apparatus comprising a member adapted to guide a strand into contact with a coating material, supporting means for the guiding member movable to normal and abnormal positions, a wiping roll mounted on the supporting means, a second wiping roll shiftably mounted and adapted to normally cooperate with the first mentioned roll, and means actuated by movement of the supporting means for shifting the second roll into its normal position.

13. A strand coating apparatus comprising a sheave, a supporting member for the sheave movable to normal and abnormal positions, a wiping roll carried by the supporting member, a second wiping roll shiftable into and out of operative position and adapted to cooperate with the first mentioned roll, yielding means holding the second roll in its inoperative position, and means actuated by movement of the supporting member for shifting the second roll into its operative position.

14. A strand coating apparatus comprising a pair of cooperating wiper rolls each movable to an operative position adjacent the other and to an inoperative position to permit threading a strand therebetween, means operative upon movement of one of the rolls to its operative position to move the other roll to its operative position, and driving means for the rolls operative only when both rolls are in operative position.

In witness whereof, I hereunto subscribe my name this 31 day of August A. D. 1927.

JOHN JANICKI.